Sept. 11, 1962 W. BREITLING 3,054,010
INDUCTION MOTOR
Filed May 22, 1958 2 Sheets-Sheet 1

INVENTOR
WILHELM BREITLING
BY Toulmin & Toulmin
ATTORNEYS

Sept. 11, 1962     W. BREITLING     3,054,010
INDUCTION MOTOR

Filed May 22, 1958     2 Sheets-Sheet 2

INVENTOR
WILHELM BREITLING
BY Toulmin & Toulmin
ATTORNEYS

United States Patent Office 3,054,010
Patented Sept. 11, 1962

3,054,010
INDUCTION MOTOR
Wilhelm Breitling, Wilhelmshaven, Germany, assignor to Olympia Werke A.G., Wilhelmshaven, Germany
Filed May 22, 1958, Ser. No. 737,061
8 Claims. (Cl. 310—254)

The present invention relates to induction motors. More in particular the present invention relates to monophase induction motors with an increased starting torque.

It has been proposed in the art to increase the starting torque of induction motors by various means taking into consideration the fact that the starting torque and the rotor resistance are directly proportional. Thus, the resistance of the rotor winding can be increased by current displacement bars, by starting resistances connected to the rotor widing via collecting rings, or by rotor bars having a high resistance.

In capacitor motors with an auxiliary phase the starting torque can also be increased to some extent by influencing the stator winding, for example, by choosing the number of windings of the main winding and the auxiliary winding according to a predetermined ratio relative to one another, by favorably dimensioning the capacitor or by providing special series transformers.

Although the starting torque can be improved to a certain extent by the afore-mentioned means, it is impossible to increase the same beyond the limit determined by the dimensions of the stator or rotor of the induction motor. This is a considerable disadvantage in view of the fact that either the rotor (current displacement bars, collecting rings) cannot be reduced beyond a certain minimum diameter and a certain minimum length. The only alternative is to equip the motor with switch means increasing the motor in size and weight to an undesirable degree.

Furthermore, the increased resistance of the rotor due to the provision of high-resistance rotor bars is accompanied by an undesirable heating of the motor.

It is particularly important to avoid the afore-mentioned disadvantages in very small motors. In such motors there is a limited installation dimension extending vertically relative to the longitudinal axis of the motor, and there is only a very limited space available for additional switch means.

It is an object of the present invention to provide an induction motor having a considerably increased startinq torque compared with known induction motors of equal size and dimensions.

It is another object of the present invention to provide an induction motor having a great starting torque which is increased beyond the limits ordinarily imposed by the dimensions of the rotor or stator but without increasing the dimensions of the latter vertically relative to the longitudinal axis of the motor.

It is a further object of the present invention to provide an induction motor having a great starting torque while at the same time retaining a comparatively small size and weight.

It is still another object of the present invention to provide an induction motor having a greatly increased starting torque while avoiding an undesirable heating due to the increased starting torque.

These objects are achieved by the induction motor of the present invention having a predetermined installation dimension extending vertically relative to the longitudinal axis of the motor and in which the rotary field winding is arranged asymmetrically with respect to the rotation of the rotor relative to the longitudinal axis of the latter, and disposed in two opposite sections of the stator each having an external diameter greater than the predetermined installation dimension and a center line vertically disposed with respect to the installation dimension, and in which the diameter of the armature (rotor) or the stator boring, respectively, is substantially greater than in conventional motors having an identical installation dimension, the increase being limited only by the magnetic and constructional requirements of the portions of the stator not having any slots for the winding.

In a mono-phase induction motor constructed according to the present invention the slots for the auxiliary winding are disposed in the adjoinnig area of the annular stator section receiving the windings on the one hand, and the cross sectional portions not having any slots, on the other hand.

The invention will be more fully appreciated upon the following more detailed explanations and the description of the accompanying drawings, wherein FIGURE 1 is a cross sectional view of a conventional induction motor showing the stator and a squirrel cage rotor;

Figure 1:
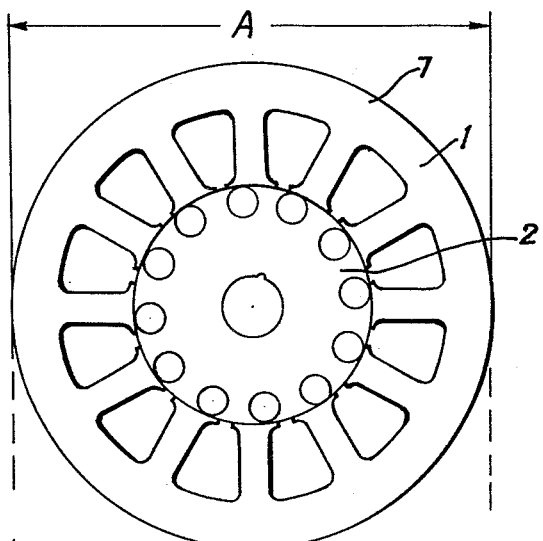

The following considerations will help to understand and appreciate the present invention.

The torque output of a given motor depends in direct proportion on the "internal" or "air gap energy" which is induced in the rotor by the stator via the air gap and which, in turn, depends on the tooth induction determined by the width of the teeth. The tooth induction decreases if the width of the teeth is increased vertically relative to the lines of flux, with the windings remaining constant. Consequently, the machine can be designed to have a higher capacity, if the tooth induction is to be maintained at its previous value. This means that the motor is capable of transferring a greater air gap energy from the stator to the rotor. Thereby the starting torque is increased, following the formula $$M_A = \frac{N_i}{\Omega}$$

wherein $M_A$ is the torque of the rotor at rest;
$N_i$ is the internal energy;
$\Omega$ is the angular speed of the magnetic field.

The width of the teeth can be increased by increasing the diameter of the rotor. Since the air gap energy is largely conditioned by the air gap flux $\phi_L$ and the rotor current $I_2$ an increase of the diameter of the rotor or the corresponding boring in the motor influences both of these factors. By maintaining the air gap induction or tooth induction, respectively, at their maximum admissible values $B_{Lmax}$ or $B_{Zmax}$ the air gap flux increases as a linear function of the increasing active surface of the boring:

$$\phi = B_{Lmax} \cdot F_{act} = B_{Lmax} \cdot c \cdot \pi \cdot D_B$$

Furthermore, the air gap energy increases as a linear function of an increasing length of the armature.

This functional interrelation is expressed by the formula:

$$N_i = C \cdot D^2 \cdot l \cdot n_1$$

wherein $C$ = constant;
$D$ = diameter of boring;
$l$ = length of armature;
$n_1$ = number of revolutions of magnetic field.

However, the air gap energy cannot be increased by elongating the armature beyond a predetermined limit. On the one hand it is extremely difficult to insert the winding into comparatively long slots in the stator. On the other hand an elongated rotor will tend to perform undesirable oscillations.

The foregoing proves that the useful torque of an induction motor increases as a square function of an increase of the diameter of the rotor.

The present invention is based on this fact and envisages an increase of the diameter of the rotor or boring in the induction motor.

In the conventional induction motors the windings are disposed symmetrically with respect to the rotation of the rotor. An elongation of the diameter of the rotor would entail a corresponding increase of the diameter of the stator. It is, however, necessary not to increase the installation dimensions vertically relative to the axis of the rotor and the present invention therefore provides stator windings which, contrary to general practice, are disposed asymmetrically with respect to the rotation of the motor and are positioned in two annular stator sections which sections are located opposite each other and whose external diameters are greater than the external diameter of the symmetrically arranged stator of a comparable conventional induction motor. In other words, the cross-section of the stator has a circular inner edge, whereas the outer edges is a circle lacking segments that are bounded by parallel chords, the diameter of this circle being greater than the maximum available installation dimension in one direction transverse to the motor axis and the distance between the chords being equal to this maximum dimension. Consequently, the diameter of the rotor can be increased accordingly.

Figure 2:
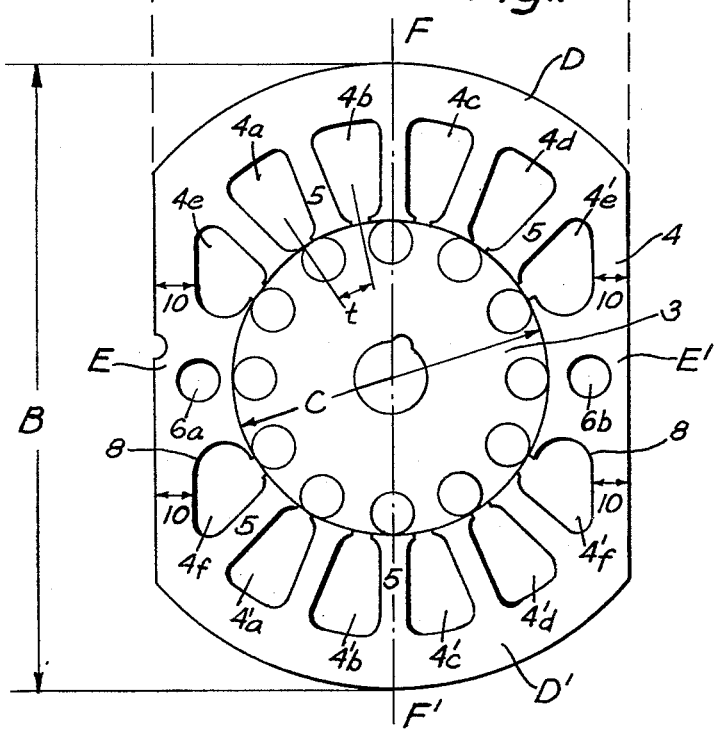
FIGURE 2 is a cross sectional view of the induction motor of the present invention showing the stator and the rotor with the asymmetrical slots for the auxiliary winding.

The external diameter of the stator 1 of the conventional induction motor is identical in length to the horizontally extending installation dimension A. The diameter of its rotor 2 is determined by the winding space of the stator and the iron cross section of the latter. In the induction motor of the present invention, comprising the stator 4 of FIGURE 2, the rotor 3 has a substantially greater diameter than the rotor 2 of the conventional motor with the installation dimension being fixed and thus being identical to that of FIGURE 1 in a horizontal direction of the plane of the drawing (vertically relative to the longitudinal axis of rotor 3), but not being fixed in a vertical direction. Thus, the dimension A is the same both in the conventional motor and in the motor of the present invention while the dimension B is comparatively larger, so that the rotor 3 can have the substantially increased diameter C compared with the motor shown in FIGURE 1.

The stator 4 has a pole pitch t and two opposite sections D and D' having an external diameter B which is substantially greater than the installation dimension A and whose center line F—F' extends vertically wtih respect to the installation dimension A. Adjoining the opposite portion D and D' there are the intermediate portions E and E'.

Contrary to the symmetrical winding in the known motor, the winding in the induction motor of the present invention is asymmetrically arranged with respect to the rotation of rotor 3. The slots 4a, 4a', 4b, 4b', 4c, 4c', and 4d, 4d' in sections D and D' receive the main windings, and the slots 4e, 4e', 4f, 4f' in the area of sections D and D' adjoining the intermediate portions E and E' receive the auxiliary windings, the slots 4e, 4e' and 4f, 4f' have an asymmetrical configuration with a bulged portion 8 protruding into the flat portion of the stator 4. This will prevent the slots from weakening the cross section 10 of the rims of the stator in the flat areas E and E' intermediate the two opposite portions D and D'.

It is, of course, also possible to apply the well known arrangement to the present invention according to which the auxiliary winding is distributed to several slots simultaneously used for housing the main windings.

Figure 3:
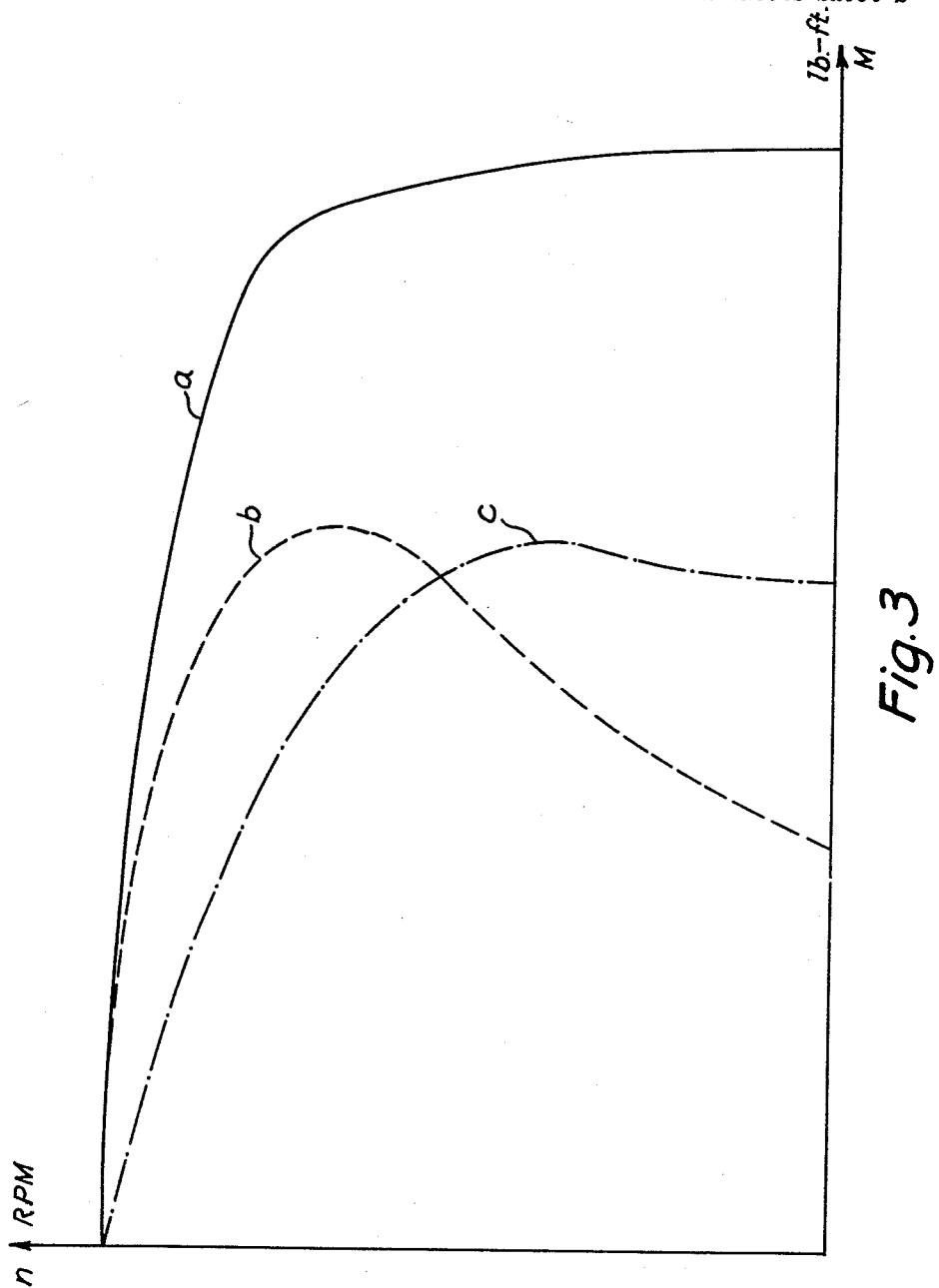
FIGURE 3 is a diagram showing the torque-number of revolutions for the motor of the present invention, a conventional motor and a conventional motor with known torque increasing means.

The great advantages of the induction motor of the present invention over all known induction motors will be easily apprehended upon comparing an induction motor of the invention with a known motor having the same installation dimension A. These advantages are shown by way of an example in FIGURE 3. Curve $b$ shows the torque M as a function of the number of revolutions per minute $n$ in a conventional capacitor machine. Curve $c$ represents the characteristics of a motor the starting torque of which is improved by the known means described further above. The increased starting torque is accompanied by a decreased number of revolutions per minute. In both instances curves $b$ and $c$ show that the starting torque is smaller than the breakdown or maximum torque of the motor.

Curve $a$ represents the characteristics of an induction motor of the present invention having a horizontal installation dimension A which is identical to that of the conventional motors having the characteristics represented by the curves $b$ and $c$. Curve $a$ shows quite distinctly the advantageous effect accomplished by the motor of the invention. The starting torque is substantially greater than the starting torque rendered by the motors represented by curves $b$ and $c$. In addition, the torque is greater in the entire range of the number of revolutions per minute $n$, because of the small resistance of the armature bars.

The distortion of the rotary field which, in turn, determines the characteristic curves representing the function of torque/number of revolutions per minute caused by the asymmetrical arrangement of the winding, can be compensated by a proper dimensioning of the auxiliary or main coils, by the number of the armature or rotor bars and the size of the capacitor. The resistance of the rotor bars can be reduced to the minimum value. As a result, the torque rendered by the motor is superior to the torque of the motors of the comparable known motors in the entire range of the number of revolutions per minute $n$, as shown by the curves $a$, $b$, $c$, respectively.

It will be understood that this invention is susceptible to modification in order to adapt it to different usages and conditions, and, accordingly, it is desired to comprehend such modifications within this invention as may fall within the scope of the appended claims.

What I claim is:

1. In an induction motor having a predetermined installation dimension extending laterally and at right angles relative to the longitudinal axis of the motor, a lamination having a circular central bore adapted to receive a rotor, two oppositely positioned, arcuate sections the external diameter thereof being greater than said installation dimension, and having a common center line extending vertically with respect to said predetermined installation dimension, said arcuate sections having a plurality of elongated slots and tongues, said lamination further including two oppositely positioned intermediate portions adjoining said two oppositely positioned arcuate sections, the outer edges of said intermediate portions being parallel, the distance between said edges being equal to said installation dimension, the center line of said intermediate portions extending vertically with respect to the center line of the arcuate sections, four deformed slots interposed between one arcuate section and one intermediate portion, respectively, said intermediate portions being free of slots and being so shaped as to define only one tongue each, the effective width thereof being greater and their length being smaller than the corresponding dimensions of the tongues in the arcuate sections, whereby said central boring may have a diameter substantially exceeding the diameter in induction motors having identical installation dimensions but formed with slots that are symmetrical with respect to the rotary axis of the rotor.

2. In an induction motor having a predetermined installation dimension extending laterally and at right angles relative to the longitudinal axis of the motor, a stator lamination having a circular central bore adapted to receive a rotor, two oppositely positioned, arcuate sections the external diameter thereof being greater than said installation dimension, and having a common center line extending vertically with respect to said predetermined installation dimension, said arcuate sections having a plurality of elongated slots and tongues, the respective center lines of said slots and tongues extending radially from the center of said circular bore, said slots and tongues being symmetrically shaped with respect to said respective center lines, said slots being so shaped that their respective bottom edges are spaced substantially equidistantly from said respective outer edges of said arcuate section, said lamination further including two oppositely positioned intermediate portions adjoining said two oppositely positioned arcuate sections, the outer edges of said intermediate portions being parallel, the distance between said edges being equal to said installation dimension, the center line of said intermediate portions extending vertically with respect to the center line of the arcuate sections, four deformed slots interposed between one arcuate section and one intermediate portion respectively, said intermediate portions being free of slots and being so shaped as to define only one tongue each, the effective width thereof being greater and their length being smaller than the corresponding dimensions of the tongues in the arcuate sections.

3. In an induction motor having a predetermined installation dimension extending laterally and at right angles relative to the longitudinal axis of the motor, a stator lamination having a circular central bore adapted to receive said rotor, two oppositely positioned, arcuate sections the external diameter thereof being greater than said installation dimension, and having a common center line extending vertically with respect to said predetermined installation dimension, said arcuate sections having a plurality of elongated slots and tongues, each of said laminations further including two oppositely positioned intermediate portions adjoining said two oppositely positioned arcuate sections, the outer edges of said intermediate portions being parallel, the distance between said edges being equal to said installation dimension, the center line of said intermediate portions extending vertically with respect to the center line of the arcuate sections, four deformed slots interposed between one arcuate section and one intermediate portion respectively, each of said last-mentioned slots having a cross-sectional area which is at least as large as the cross-sectional area of one of the other slots, and further having a bottom edge spaced from the adjacent straight outer edge of the associated intermediate stator portion, at a distance substantially equal to the distance which the bottom of each of said symmetrical slots is spaced from the arcuate edge of the stator, each of said deformed slots having a side edge which extends parallelly to the center line of the adjoining tongue pertaining to the adjacent arcuate section, each of said deformed slots having an arcuate side edge which is making arcuate those of said deformed slots pertaining to the same intermediate section defining a tongue of said intermediate section, said arcuate edges forming for said tongue a large pole-shoe, said intermediate portions being free of slots and being so shaped as to define only one tongue each, the effective width thereof being greater and their length being smaller than the corresponding dimensions of the tongues in the arcuate sections.

4. In an induction motor having in one given direction of rotation a maximum permissible dimension, the improvement comprising a stator having an annular cross-section the inner edge thereof being circular, the outer edge thereof being a circle lacking segments that are bounded by parallel chords, the diameter of said last mentioned circle being greater than said maximum permissible dimension, the distance between said chords being equal to said maximum permissible dimension, said stator being provided with a plurality of elongated and two shortened tongues, the respective center lines thereof extending radially from the center of said circular inner edge, said two shortened tongues being positioned adjacent said chords, respectively and further being so shaped that their length is substantially smaller than the corresponding dimensions of said elongated tongues, thereby making it possible for a rotor in said enlarged circular bore to be larger than if said tongues were arranged symmetrically with respect to the central axis of the rotor with the same distances between each other.

5. In an induction motor having in one direction perpendicular to its axis of rotation a maximum permissible dimension, the improvement comprising a stator of annular cross-section having an inner and an outer edge, said outer edge being a circle lacking segments that are bounded by parallel chords, thereby defining two arcuate stator sections interconnected by intermediate sections, the diameter of said circle being larger than said maximum permissible dimension, said inner edge being a circle having a diameter larger than that of the inner edge of an induction motor stator of annular cross-section having a completely circular outer edge with a diameter equal to said maximum permissible dimension, said arcuate sections being provided with a plurality of elongated slots and tongues, having center lines extending radially from the center of said circular inner edge, said slots having bottom edges spaced substantially equidistanly from the adjoining outer edge of the stator; said intermediate portions each having a shortened tongue, the working width thereof being larger and the length thereof being smaller than the corresponding dimensions of the tongues in the arcuate sections; deformed slots, one each, in the portion between an arcuate section and an adjoining intermediate section, each of said deformed slots having a bottom edge spaced from the straight edge of the stator chords at a distance substantially equal to the distance which the bottom of each of said elongated slots is spaced from the arcuate edge of the stator, said stator adapted to receive said rotor having a diameter substantially exceeding the diameter of induction motors having identical installation dimensions but formed with slots that are symmetrical with respect to the rotary axis of the rotor, whereby the induction motor has a speed/torque characteristic which is greater than the speed/torque characteristic of an induction motor incorporating a stator having slots arranged symmetrically with respect to the rotary axis of the rotor.

6. In an induction motor having in one direction perpendicular to its axis of rotation a maximum permissible dimension, the improvement comprising a stator of annular cross-section having an inner and an outer edge, said outer edge being a circle lacking segments that are bounded by parallel chords, thereby defining two arcuate stator sections interconnected by intermediate sections, the diameter of said circle being larger than said maximum permissible dimension, said inner edge being a circle having a diameter larger than that of the inner edge of an induction motor stator of annular cross-section having a completely circular outer edge with a diameter equal to said maximum permissible dimension, said arcuate sections being provided with a plurality of elongated slots and tongues, having center lines extending radially from the center of said circular inner edge, said slots having bottom edges spaced substantially equidistantly from the adjoining outer edge of the stator; said intermediate portions each having a shortened tongue, the working width thereof being larger and the length thereof being smaller than the corresponding dimensions of the tongues in the arcuate sections; deformed slots, one each, in the portion between an arcuate section and an adjoining intermediate section, each of said deformed slots having a bottom edge spaced from the straight edge of the stator chords at a distance substantially equal to the distance which the bottom of each of said elongated slots is spaced from the arcuate edge of the stator, said stator adapted to receive said rotor having a diameter substantially exceeding the diameter of induction motors having identical installation dimensions but formed with slots that are symmetrical with respect to the rotary axis of the rotor, whereby the induction motor has a starting torque and a speed/torque characteristic which is greater than the starting torque and speed/torque characteristic of an induction motor incorporating a stator of annular cross-section having slots arranged symmetrically with respect to the rotary axis of the rotor.

7. A lamination as defined in claim 1 wherein each of said deformed slots has an edge parallel to said center line of said arcuate sections.

8. A lamination as defined in claim 1 wherein each of said deformed slots has an edge parallel to said outer edges of said intermediate portions.

References Cited in the file of this patent

UNITED STATES PATENTS

| | | |
|---|---|---|
| 1,173,089 | Bergman | Feb. 22, 1916 |
| 1,401,996 | Lundell | Jan. 3, 1922 |
| 2,830,209 | Fleckenstein | Apr. 8, 1958 |

FOREIGN PATENTS

| | | |
|---|---|---|
| 920,739 | Germany | Nov. 29, 1954 |